United States Patent [19]

Brichard et al.

[11] 4,105,827

[45] Aug. 8, 1978

[54] PARTICULATE PEROXYGEN COMPOUNDS COATED WITH SODIUM SESQUICARBONATE OR $Na_2SO_4 \cdot MNa_2CO_3$

[75] Inventors: Jean Brichard, Vilvoorde; Jean-Claude Colery; Fernand Meuret, both of Brussels, all of Belgium

[73] Assignee: Interox, Brussels, Belgium

[21] Appl. No.: 641,634

[22] Filed: Dec. 17, 1975

Related U.S. Application Data

[63] Continuation of Ser. No. 461,283, Apr. 15, 1974, abandoned.

[30] Foreign Application Priority Data

Apr. 20, 1973 [LU] Luxembourg ............................ 67482
Nov. 19, 1973 [LU] Luxembourg ............................ 68831

[51] Int. Cl.² ............................................... C11D 7/38
[52] U.S. Cl. ..................................... 428/403; 427/215; 427/213; 423/274; 423/267; 252/186
[58] Field of Search ................ 427/215, 213; 423/267, 423/274, 275; 428/403; 252/103, 385, 186, 199

[56] References Cited

U.S. PATENT DOCUMENTS

| | | | |
|---|---|---|---|
| 2,308,992 | 1/1943 | Mertens | 117/100 B |
| 2,874,123 | 2/1959 | Schaafsma | 252/135 |
| 2,979,464 | 4/1961 | Pestor | 252/99 |
| 3,706,671 | 12/1972 | Hardy | 252/186 |
| 3,989,635 | 11/1976 | Toyoda et al. | 252/135 |

FOREIGN PATENT DOCUMENTS

594,296  3/1960  Canada ...................................... 252/99

*Primary Examiner*—Ronald H. Smith
*Assistant Examiner*—Sam Silverberg
*Attorney, Agent, or Firm*—Larson, Taylor and Hinds

[57] ABSTRACT

Particulate peroxygen compounds selected from alkali metal percarbonates, perpyrophosphates, pertripolyphosphates and peroxymonosulphates are stabilized by coating the particles with a mixed salt selected from sesquicarbonate having the formula $Na_2CO_3 \cdot NaHCO_3 \cdot 2H_2O$ and mixed compounds obtained by crystallization of sodium sulfate and sodium carbonate of formula $Na_2SO_4 \cdot nNa_2CO_3$ where $n$ is a number from 0.3 to 3.

16 Claims, No Drawings

PARTICULATE PEROXYGEN COMPOUNDS COATED WITH SODIUM SESQUICARBONATE OR Na₂SO₄MNa₂CO₃

This is a continuation, of application Ser. No. 461,283 filed Apr. 15, 1974 now abandoned.

The present invention relates to particulate peroxygen compounds stabilized by coating, to a coating process therefor and to detergent mixtures containing such compounds.

It is well known that peroxygen compounds can be employed as bleaching compounds in powder detergent mixtures. Sodium perborate tetrahydrate is usually employed as a bleaching compound in the standard domestic detergents because it is comparatively stable to decomposition in a detergent medium. However, the practice of using cold laundry washing and steeping techniques is becoming increasingly widespread. Under such conditions, sodium perborate suffers from the disadvantage of dissolving too slowly at 20° C.

It has been suggested that one way of overcoming this disadvantage is to use detergent powders admixed with many other inorganic peroxygen compounds, particularly the percarbonates, perphosphates and peroxy monosulphates of alkali metals, which have suitable dissolution rates. The said peroxygen compounds, particularly the percarbonates, decompose too rapidly, particularly when they are stored in a moist atmosphere. In addition, the other ingredients of the cleaning composition may even trigger decomposition. One method which has been suggested as a way of avoiding this defect involves coating peroxygen compounds with stabilising substances or protecsive inorganic films, for example a sodium silicate solution (A. Welter — Br. Pat. No. 174891 of 26.7.1920) or certain magnesium salts, for example magnesium sulphate heptahydrate. In this case, comparatively large proportions of coating agents must be used in order to ensure adequate stability and the granules of stored material show a partial tendency to agglomeration.

The present invention relates to a process for stabilizing peroxygen compounds selected from alkali metal persalts by coating, characterized in that the coating is a mixed salt obtained by crystallization of sodium carbonate with another inorganic salt selected from sodium bicarbonate and sulphate. It is preferred to use as mixed salt sodium sesquicarbonate having as formula $Na_2CO_3 \cdot NaHCO_3 \cdot 2 H_2O$ or mixed compounds obtained by crystallisation of sodium sulphate and sodium carbonate of formula $Na_2SO_4 \cdot nNa_2CO_3$ where $n$ is a number from 0.3 to 3, and advantageously from 0.5 to 1.1.

According to the present invention, there is provided a particulate peroxygen compound selected from an alkali metal persalt characterized in that it is coated with a mixed salt obtained by crystallization of sodium carbonate with another inorganic salt selected from sodium bicarbonate and sodium sulphate. Suitably the particules of peroxygen compounds can be coated with sodium sesquicarbonate, or with a mixed salt of sodium sulphate and carbonate of formula $Na_2SO_4 \cdot nNa_2CO_3$ where $n$ is a number from 0.3 to 3.

Suitable alkali metal persalts which are normally unstable to water induced decomposition on storage, which advantageously may be coated according to the present invention, include the percarbonates, perpyrophosphates, pertripolyphosphates; persilicates and peroxymonosulphates.

Typically sodium percarbonate can be coated extremely successfully using a process according to the present invention.

Advantageously the coating comprises from 0.5 to 20% by weight based on the persalt. An amount of 0.5% by weight is sufficient to ensure at least partial coating and improved stabilisation of the peroxygen compound, and it is unnecessary to use more than 20% by weight to ensure a complete coating.

Suitably, an amount of coating comprised from 3 to 15% by weight based on the persalt is used.

Desirably peroxygen compounds according to the present invention may be used in washing or bleaching compositions. Other standard components may be included in such compositions, for example bleaching activators, anionic or non-ionic surfactants, builders, such as carbonates, phosphates, pyrophosphates, tripolyphosphates, silicates, antiredisposition agents such as carboxymethyl-cellulose, optical bleaching agents, proteolytic and/or amylolytic enzymes, stabilisers, anti corrosion agents and the like. Suitable anionic or non-ionic surfactants include those described by Z. P. Sisley and P. I. Wood in The Encyclopaedia of Surface Active Agents published by Chemical Publishing Co., New York, Volume 1 in 1961 and in Volume II in 1964, those in French patent specification No. 1589887 and those in German patent specification No. 1594865.

In particular, in certain embodiments according to the present invention the peroxygen compound satisfies the following test, by losing no more than 15% of active oxygen after 4 weeks in admixture with a base detergent, i.e., a detergent powder which contains no peroxygen compound but does contain the other usual ingredients, in a sufficient amount to provide 2% by weight of active oxygen in the mixture. The compositions of one such base detergent powder is shown in Table 2 herein. Storage of the mixture is conducted at 28° C and a relative humidity of 70% in cardboard boxes sealed internally and externally by a film of cellulose acetate.

Coating of the persalt particles may be carried out using any recognised means, and the method employed is not critical but one preferred technique comprises spraying an aqueous solution of sodium carbonate, containing in addition either sodium bicarbonate or sodium sulphate onto moving particles of the persalt, and evaporating off water at a temperature conducive to formation of a mixed salt, and thereby depositing the mixed salt on the surface of the persalt.

When the mixed salt is to be sodium sesquicarbonate or a sodium sulphate/sodium carbonate mixed salt the temperature of the solution from which the mixed salt is deposited should be be maintained at between 30° and 80° C. The nature of the mixed salt will also depend of course on the mole ratio of the constituents of the mixed salt and can be seen from the phase diagrams of the system. In the case of the sodium carbonate/sodium bicarbonate/water system, the information is available in Kirk Othmer Encyclopaedia of Chemical Technology Volume 18 Second Edition on page 466.

Apparatus in which moving persalt particles may be sprayed, suitably comprises a fluidized bed, a rotary hearth, a rotary drum or other similar recognized devices. It is preferred to use a fluidized bed because a more hermetic and more homogenous coating generally results, all other conditions of coating being equal, thereby resulting in less coating agent being required to stabilise the persalt particles to a given extent, and thus reducing the amount of solvent, usually water, which must be removed by evaporation. Coating using a fluidized bed may be carried out continuously or batch-wise. If a continuous coating method is used the fluidised bed should preferably be compartmented. Product can be removed from one compartment of such a bed by simply overflowing, or by elutriation via a pipe located at any desired level in the bed. The temperature at which simultaneously the persalt is coated, and solvent is evaporated off is of course controlled at below the decomposition temperature of the persalt. Naturally the decomposition temperature will vary according to the identity of the persalt, but in general the limit may be set at 100° C. However, in the case of sodium percarbonate, which is a comparatively heat sensitive product, it is preferred not to exceed approximately 80° C.

Certain embodiments of the present invention will now be described more fully by way of example. Examples 3, 4, 5 and 8 are according to the present invention. Examples 6 and 7, which describe coating using respectively solely carbonate or sodium sulphate, and Examples 1 and 2 employing respectively uncoated sodium percarbonate and uncoated sodium perborate are present for purposes of comparison only.

In Examples 3 to 8 sodium percarbonate was coated using a batchwise process in a fluidized bed.

The apparatus used consisted of a cylinder of 15cm diameter and 77 cm height, fitted at its base with a gas distributor plate pierced with holes of 2mm diameter, and provided with a pipe bundle for heating using steam maintained at an effective pressure of 1 kg/cm².

First of all the apparatus was charged with 3 kg of homogenous sodium percarbonate granules. A stream of air was then passed through the gas distributor plate to fluidise the sodium percarbonate granules, and an aqueous solution to form the appropriate coating agent was sprayed onto the granules through a pneumatic spray located on the wall of the cylinder 11 cms above its base. The height of the bed is equal to 30 cm. When introduction of the solution had been completed, and the coated persalt granules dried, the granules were then removed from the apparatus.

The operating conditions for each Example, are summarized in Table 1 herein below.

Table I

|  | Ex. 3 | Ex. 4 | Ex. 5 | Ex. 6 | Ex. 7 | Ex. 8 |
| --- | --- | --- | --- | --- | --- | --- |
| Coating Conditions |  |  |  |  |  |  |
| Rate of flow of fluidising gas, m³N/h | 38 | 37 | 38 | 31 | 32 | 31 |
| Input temperature of fluidising gas, ° C | 80 | 102 | 83 | 120 | 120 | 120 |
| Duration of spraying with solution, minutes | 35 | 40 | 30 | 30 | 30 | 30 |
| Amount of solution introduced, kg | 0,47 | 0,94 | 0,48 | 0,60 | 0,60 | 0,75 |
| Concentration in the solution in g/kg |  |  |  |  |  |  |
| of Na₂SO₄ | 180 | 180 | 228 | — | 250 | — |
| of Na₂CO₃ | 140 | 140 | 85 | 250 | — | 172 |
| of NaHCO₃ | — | — | — | — | — | 60 |
| Mole ratio Na₂CO₃/Na₂SO₄ | 1,04 | 1,04 | 0,5 | — | — | — |
| Mole ratio Na₂CO₃/NaHCO₃ | — | — | — | — | — | 2,27 |
| Weight ratio of coating agent to persalt, g/100 g | 5 | 10 | 5 | 5 | 5 | 5 |
| Fluidised bed Temperature ° C | 50 | 50 | 52 | 60 | 60 | 50 |
| Properties of Coated Percarbonate |  |  |  |  |  |  |
| Mean diameter of the granules mm | 0,42 | 0,39 | 0,42 | 0,415 | 0,41 | 0,41 |
| Free flowing specific weight kg/dm³ | 1,20 | 1,15 | 1,22 | 1,21 | 1,19 | 1,20 |
| Active oxygen content g/kg | 134 | 131 | 135 | 135 | 135 | 134 |

Table I-continued

|  | Ex. 3 | Ex. 4 | Ex. 5 | Ex. 6 | Ex. 7 | Ex. 8 |
| --- | --- | --- | --- | --- | --- | --- |
| g/kg |  |  |  |  |  |  |

Shelf Test

The following tests were carried out to evaluate the effectiveness of coating percarbonate according to the present invention.

(a) Shelf Test in Small Boxes

In this test mixtures were used which contained approximately 2% of active oxygen comprising 7 g of sodium percarbonate (uncoated or coated) or 10.5 g of sodium perborate (uncoated) and 42 g of a commercial persalt-free base detergent powder either with or without enzymes having compositions given in Table 2. After homogenization, the mixtures were placed in cardboard boxes (11.5 × 7 × 2 cm) lined on both sides with a cellulose acetate film resulting in a permeability by water of 550 g.H₂O/m².day. The filled boxes were then stored at 28° C at 70% relative humidity for 4, 8 and 12 weeks respectively. In a second series of tests further portions of the mixtures were placed in similarly sized boxes which had been coated with a microcrystalline wax, to give a permeability by water of 5 g/m²/day. These boxes were stored at 35° C and 80% relative humidity for 4 to 8 weeks.

After each storage period, the active oxygen content of the powder was determined by direct titration with (N/2)KMnO₄ and the active oxygen loss relative to the original active oxygen evaluated. The percentage active oxygen loss of the coated sodium percarbonate was compared with the percentage active oxygen loss of the uncoated sodium percarbonate and of the sodium perborate (stabler product taken as reference) prepared under the same test conditions. The results are expressed in terms of the formula:

$$\frac{T_{PCS}\text{ uncoated} - T_{PCS}\text{ coated}}{T_{PCS}\text{ uncoated} - T_{PBS}\text{ uncoated}} \times 100 = x\%$$

in which T represented the "active oxygen loss." They showed the percentage improvement in the stability of sodium percarbonate attributable to coating in relation to the stability of uncoated sodium perborate which was taken as a reference because most consumers felt it to be adequate. The active oxygen content was measured by introducing approx. 10g of washing powder weighed to the nearest 0.01g in a 750 cc capacity "Erlenmeyer" flask, adding 100 cc of 6N H₂SO₄, 100 cc of distilled water and 2 drops of silicone anti-foaming agent. The mixture was then shaken until such time as a homogeneous solution was obtained and then titrated with N/2 KMnO₄ until a pink coloration lasting 30 sec. was obtained. A blank test was also performed on an equivalent amount of washing powder not containing persalt. The active oxygen content of the specimen, O, expressed in g of oxygen/kg was given by the relationship $$O, g/kg = (a - b) \times \frac{1}{2} \times \frac{1000}{P} \times \frac{0.016}{2}$$

in which $a$, cm³, denoted the volume of N/2 KMnO₄ used for titrating the powder containing persalt $b$, cm³, denoted the volume of N/2 KMnO₄ used for the blank titration $p$, g, denoted the weight of sample employed.

The results of the foregoing shelf tests are summarised in the following Tables 3 and 4. These results clearly point to the superiority of stability to decomposition of percarbonate coated with a mixed salt according to the present invention, in comparison with uncoated percarbonate, or percarbonate coated with only sodium carbonate or sodium sulphate.

Table 2

| Commercial Powder used in Shelf Tests | | Without Enzymes | With Enzymes |
|---|---|---|---|
| Sodium alkylarylsulphonate, | g/100 g | 24 | 29 |
| Phosphates - Na₅P₃O₁₀ (*) | g/100 g | 43 | 29 |
| Silicates - Na₂0.2SiO₂ (**) | /100 g | 9 | 7 |
| Na₂SO₄ | g/100 g | 12 | 25 |
| H₂O | g/100 g | 12 | 9 |
| Enzymes D.U./g | | — | 850 |

(*) total P₂O₅ expressed in terms of Na₅P₃O₁₀
(**) total SiO₂ expressed in terms of Na₂0.2SiO₂

In Tables 3 and 4 the persalt is sodium percarbonate unless otherwise stated.

Table 3

Results of Shelf Tests using Enzyme-Free Detergents

| | | % Active Oxygen Loss / % improvement in stability | | | | |
|---|---|---|---|---|---|---|
| | | at 28° C and 70% RH. | | | at 35° C and 80% RH. | |
| Coating of Persalt | Ex. No. | 4 | 8 | 12 | 4 | 8 |
| Uncoated sodium percarbonate | 1 R | 13/- | 15/- | 23/- | 17/- | 25/- |
| Uncoated Sodium Perborate | 2 R | 0/- | 1/- | 2/- | 4/- | 6/- |
| Sodium percarbonate coated with | | | | | | |
| Na₂SO₄, 1,05 Na₂CO₃ | 3 | 3/77 | 11/29 | 17/29 | 0/131 | 8/87 |
| Na₂SO₄, 1,05 Na₂CO₃ | 4 | 3/77 | 10/36 | 16/33 | 6/85 | 13/63 |
| Na₂SO₄, 0,5 Na₂CO₃ | 5 | 6/54 | 12/21 | | 7/77 | 13/63 |
| Na₂CO₃ | 6 R | 7/46 | 13/14 | | 10/54 | 16/47 |
| Na₂SO₄ | 7 R | 7/46 | | | 11/46 | 17/42 |
| NaHCO₃, Na₂CO₃ | 8 | 5/62 | | | | |

Table 4

Results of Shelf Tests using Enzyme-Free Detergents

| | | % Active Oxygen Loss / % improvement in stability | | | | |
|---|---|---|---|---|---|---|
| | | at 28° C and 70% RH. | | | at 35° C and 80% RH. | |
| Coating of Persalt | Ex. No. | 4 | 8 | 12 | 4 | 8 |
| Uncoated sodium percarbonate | 1 R | 40/- | 75/- | 88/- | 37/- | 57/- |
| Uncoated Sodium Perborate | 2 R | 5/- | 10/- | 32/- | 4/- | 9/- |
| Sodium percarbonate coated with | | | | | | |
| Na₂SO₄, 1,05Na₂CO₃ | 3 | 13/77 | 41/52 | 54/61 | 1/109 | 12/94 |
| Na₂SO₄, 1,05Na₂CO₃ | 4 | 14/74 | 35/62 | 47/73 | 7/91 | 16/85 |
| Na₂SO₄, 0,5 Na₂CO₃ | 5 | 15/71 | 36/60 | 56/57 | 8/88 | 16/85 |
| Na₂CO₃ | 6 R | 12/80 | 44/48 | 58/54 | 14/70 | 30/56 |
| Na₂SO₄ | 7 R | 13/77 | 46/44 | 61/48 | 14/70 | 31/54 |

(b) Shelf Tests in Commercial Boxes

In this test mixtures were prepared which contained 3.3% by weight of active oxygen, by mixing 94 grams of uncoated sodium percarbonate having an active oxygen content of 140 g/kg, or 98.5 grams of sodium percarbonate coated with sodium sesquicarbonate having an active oxygen content of 134 g/kg with enough persalt-free enzyme-free base detergent powder having the composition shown in Table 2 to make up to 400 grams.

After homogenization the mixtures were placed in cardboard boxes of dimensions 20 × 14 × 5.5 cm which had been treated under heat with a micro-crystalline wax. The boxes were then stored at 20° or 35° C and an atmosphere of 80% relative humidity for 2, 4 and 8 weeks, and the tests were carried out in triplicate.

At the end of the selected storage period the active oxygen content of each mixture was measured by titration of a known amount of mixture dissolved in a known volume of water, against N/10 KMnO₄. The active oxygen Run in Table 5 following, is expressed as a percentage of the active oxygen present in the mixture before storage.

In more detail the method of measuring the active oxygen content comprised withdrawing a representative sample of about 10 - 20g, weighed to the nearest 0.01g — P grams — and 50 ml of 60% H₂SO₄ dissolved in 1 liter of distilled water 57° C ± 2° C in a 2 liter beaker. The contents were stirred using a SILVERSON (Silverson is a trademark for a mixer-emulsifyer) type LR 2 1-inch stirrer immersed to a depth of 1 cm from the bottom of the beaker, and being rotated at top speed. When the temperature of the solution had fallen to about 48° - 52° C, the weighed sample was added. Stirring continued for 1 minute or longer until all the sample was dissolved. The solution was allowed to stand for 30 seconds to allow deaeration, and 50 ml was transferred to a 250 ml erlenmeyer flask, and stirred vigorously against standardised N/10 KMnO₄. The amount of KMnO₄ solution required to reach the end point, a pink coloration lasting at least 15 seconds after addition of 1 more drop of KMNnO₄ — T mls — was noted. The active oxygen content of the mixture was then expressed using the general formula $$\% \text{ active oxygen} = \frac{TN}{P} \times \frac{0.8 \times 1050}{50}$$

wherein N is the actual normality of the KMNnO₄.solution. P is the weight of the sample.

The results of the tests are summarized in Table 5.

Table 5

Results of Shelf Tests in Boxes of Commercial Design

| | % active oxygen lost during storage | | | | | |
|---|---|---|---|---|---|---|
| | at 20° C and 80% relative humidity | | | at 35° C and 80% relative humidity | | |
| Coating | 2 wks | 4 wks | 8 wks | 2 wks | 4 wks | 8 wks |
| Uncoated | — | 5.1 | 6.4 | 8.5 | 9.7 | 18.1 |
| 5% of sodium sesquicarbonate | — | 5.0 | 5.6 | 5 | 5.4 | 12.3 |

These results clearly show the superiority of the products of the invention over the uncoated percarbonate.

We claim:

1. In a process for stabilizing particulate peroxygen compound selected from alkali metal percarbonates, perpyrophosphates, pertripolyphosphates and peroxymonosulphates by coating said particulate peroxygen compound with a coating agent to provide an hermetic coating, the improvement which comprises using as said coating agent a mixed salt selected from sesquicarbonate having the formula $Na_2CO_3.NaHCO_3.2H_2O$ and mixed compounds obtained by crystallization of sodium sulfate and sodium carbonate of formula $Na_2SO_4.nNa_2CO_3$ where $n$ is a number from 0.3 to 3.

2. A process according to claim 1 wherein the mixed salt is sodium sesquicarbonate.

3. A process according to claim 1 wherein the mixed salt is the mixed salt of sodium sulphate and carbonate of formula $Na_2SO_4.nNa_2CO_3$ where $n$ is a number from 0.3 to 3.

4. A process according to claim 1 wherein $n$ is from 0.5 to 1.1.

5. A process according to claim 1 wherein the peroxygen compound is sodium percarbonate.

6. A process according to claim 1 wherein the coating comprises from 0.5 to 20% by weight of the peroxygen compound.

7. A process according to claim 6 wherein the coating comprises from 3 to 15% by weight of the peroxygen compound.

8. A process according to claim 1 the coating is effected by spraying an aqueous solution of sodium carbonate and sodium bicarbonate onto particles of the peroxygen compound maintained in a bed fluidized by an updraft of an inert gas, the temperature of the bed being held between 30° and 80° C.

9. A process according to claim 1 wherein the coating is effected by spraying an aqueous solution of sodium carbonate and sodium sulphate onto particles of the peroxygen compound maintained in a bed fluidized by an updraft of an inert gas, the temperature of the bed being held between 30° and 80° C.

10. Stabilized particles of peroxygen compounds selected from the group consisting of alkali metal percarbonates, perpyrophosphates, pertripolyphosphates and peroxymonosulphates having a hermetic coating of a mixed salt selected from sesquicarbonate having the formula $Na_2CO_3.NaHCO_3.2H_2O$ and mixed compounds obtained by crystallization of sodium sulfate and sodium carbonate of formula $Na_2SO_2.nNa_2CO_3$ where $n$ is a number from 0.3 to 3.

11. Particles according to claim 10 wherein the mixed salt is sodium sesquicarbonate.

12. Particles according to claim 10 wherein the mixed salt is a mixed salt of sodium sulphate and carbonate of formula $Na_2SO_4.nNa_2CO_3$ where $n$ is a number from 0.3 to 3.

13. Particles according to claim 12 wherein $n$ is from 0.5 to 1.1.

14. Particles according to claim 10 wherein peroxygen compound is sodium percarbonate.

15. Particles according to claim 10 wherein the coating comprises from 0.5 to 20% by weight of the peroxygen compound.

16. Particles according to claim 15 the coating comprises from 3 to 15% by weight of the peroxygen compound.

* * * * *